E. A. BERN.
PILING.
APPLICATION FILED JUNE 8, 1907.
950,608.
Patented Mar. 1, 1910.
5 SHEETS—SHEET 2.
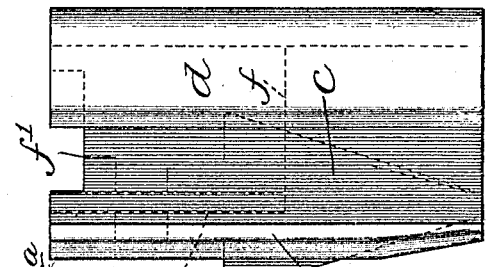
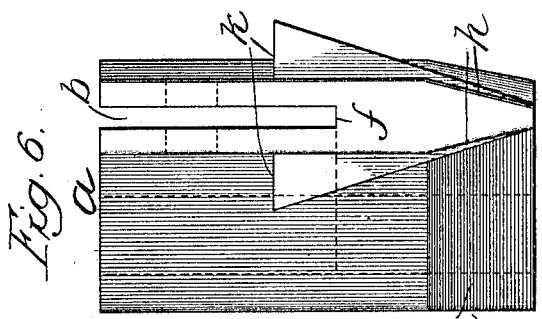
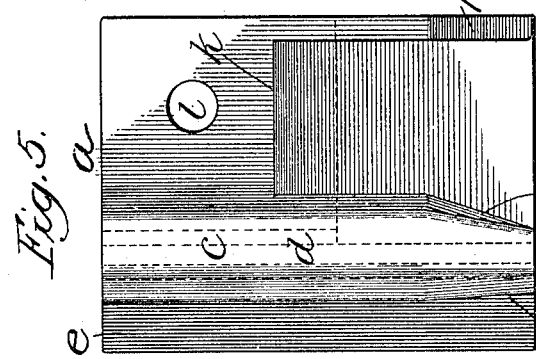
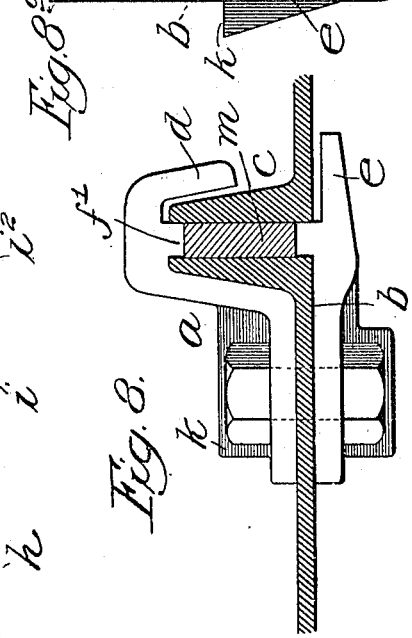
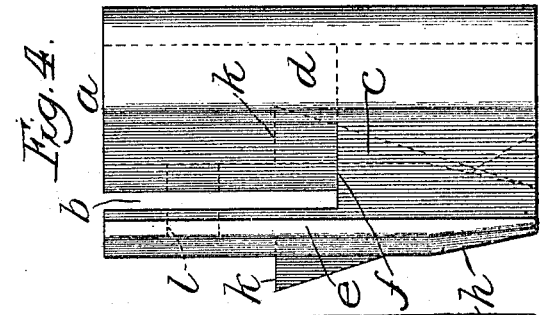
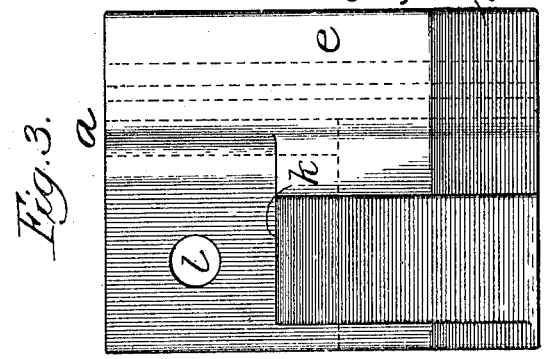
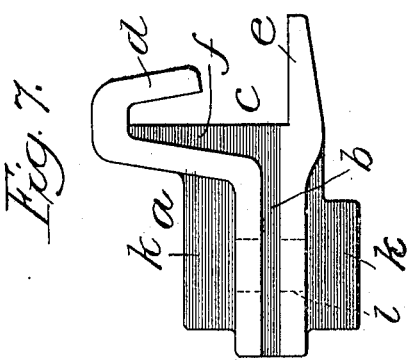
Witnesses:
Inventor:
Edward A. Bern,
By Sheridan & Wilkinson
Attys

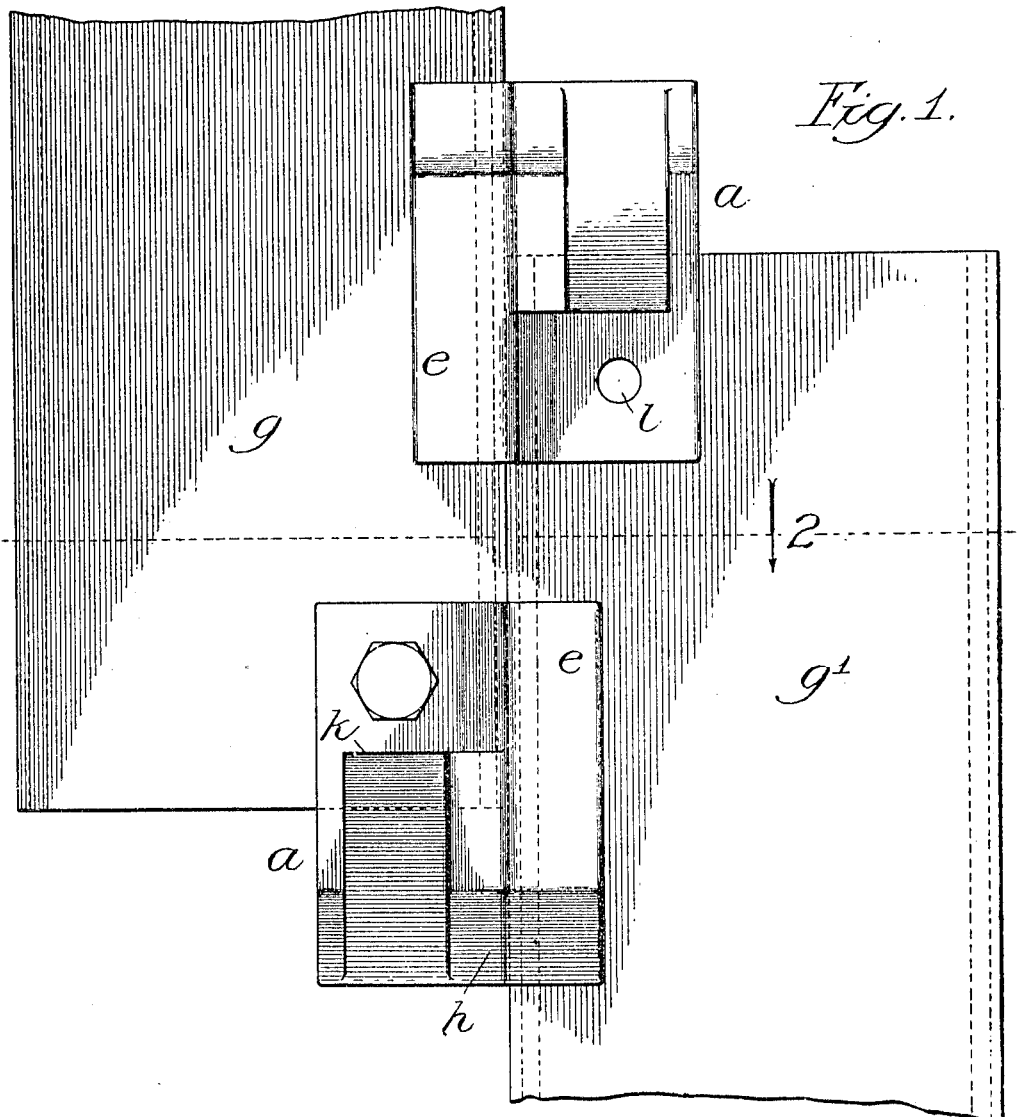
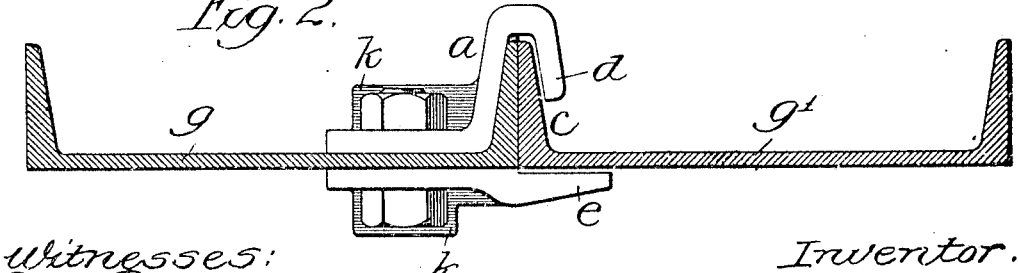

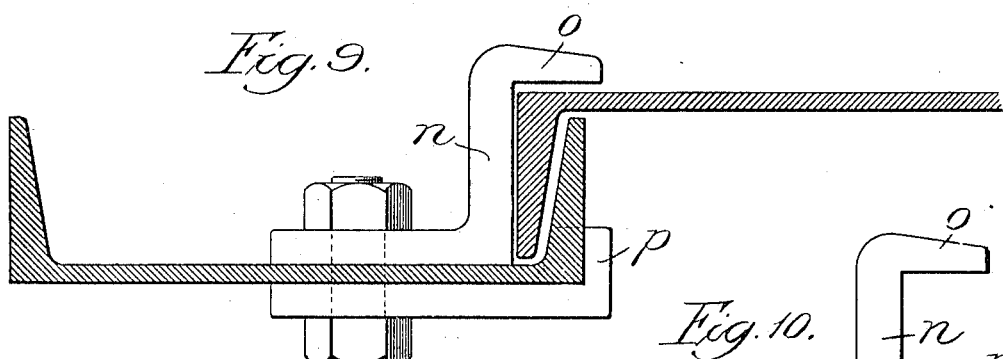
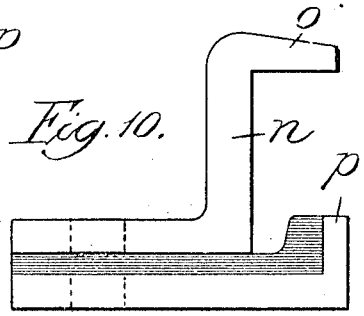
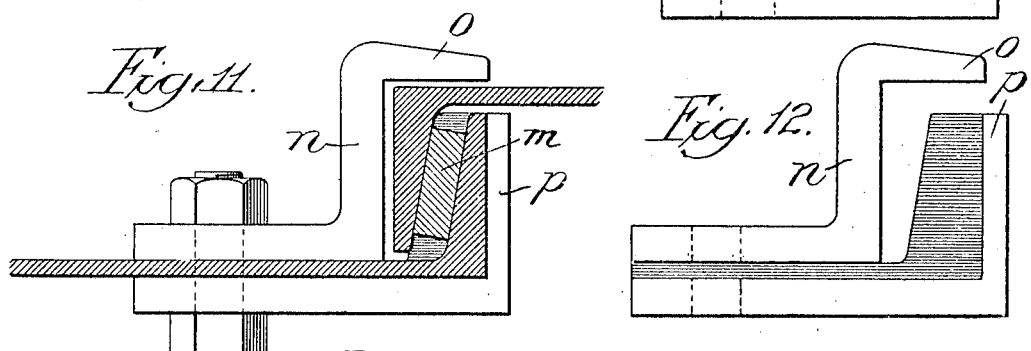
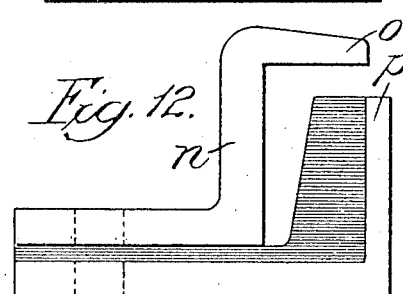
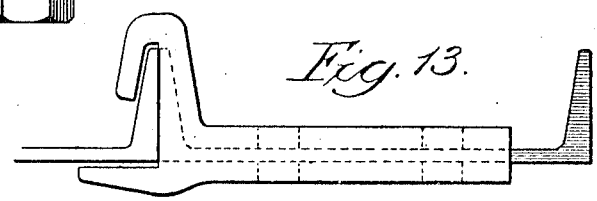
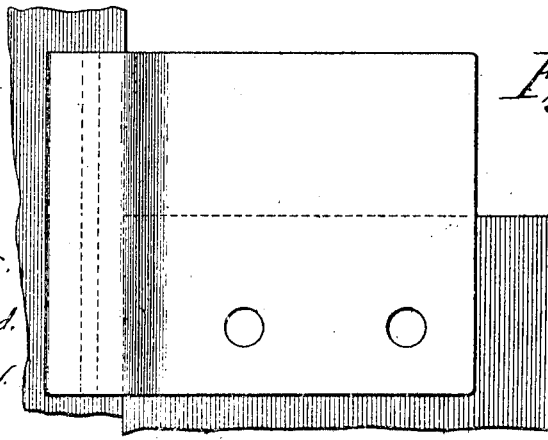

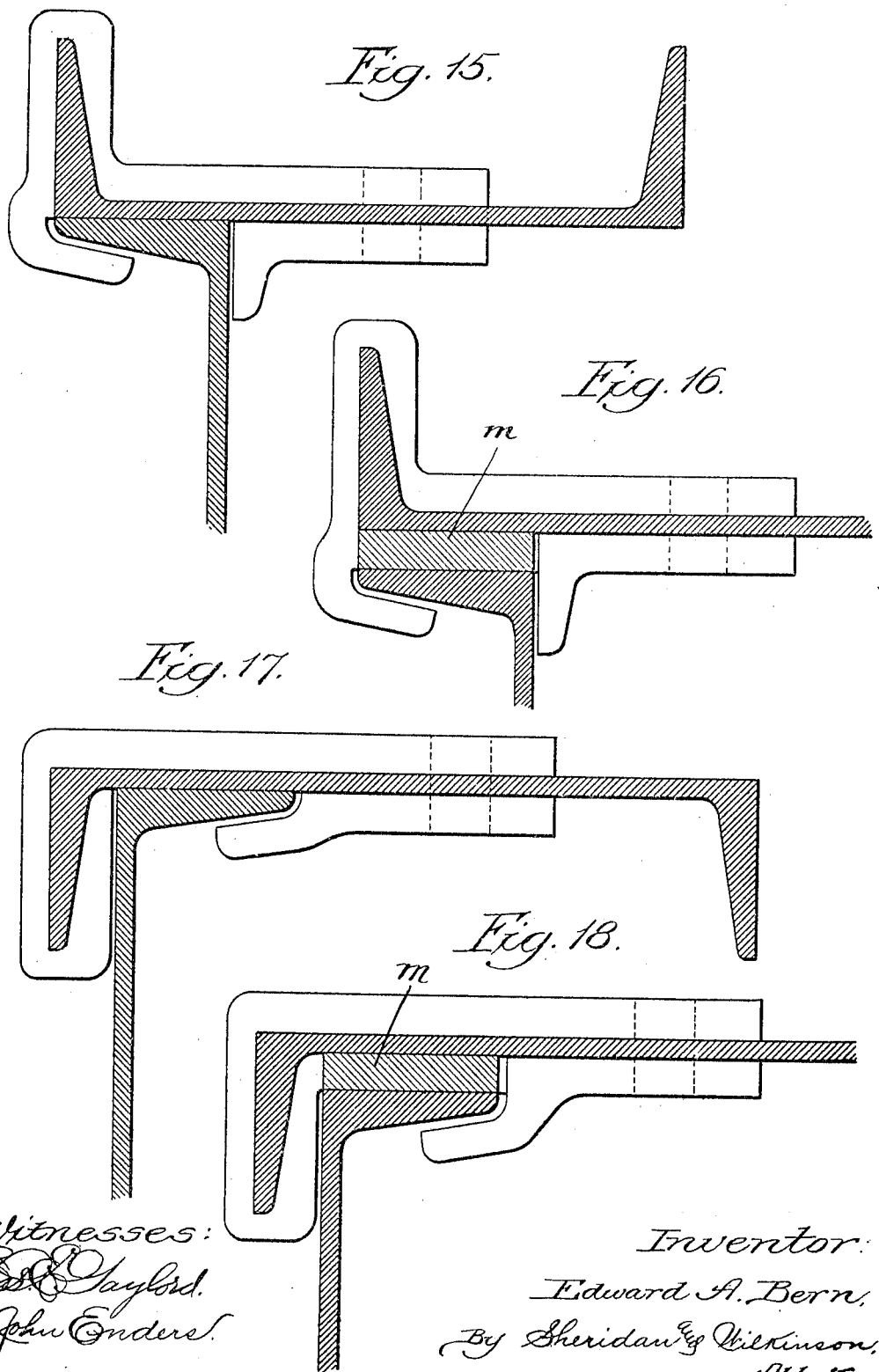

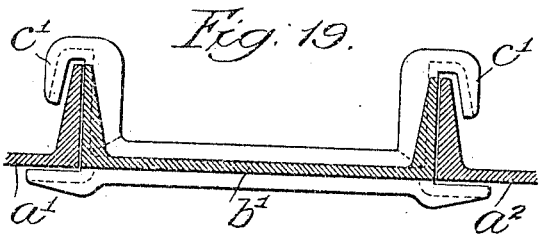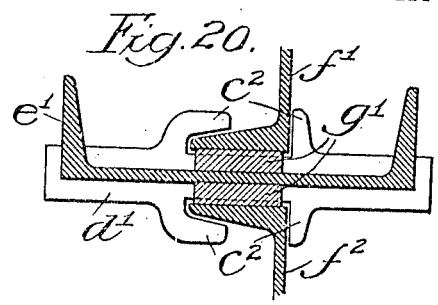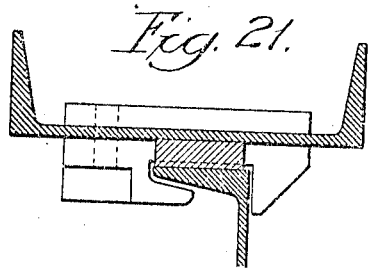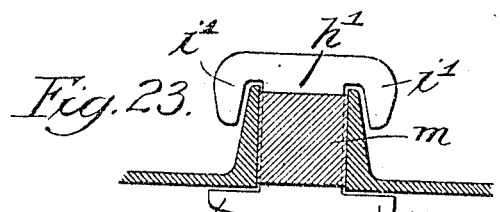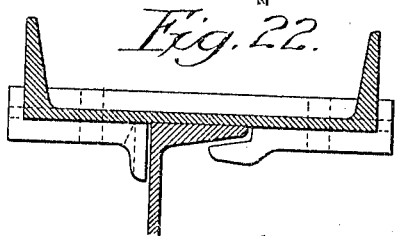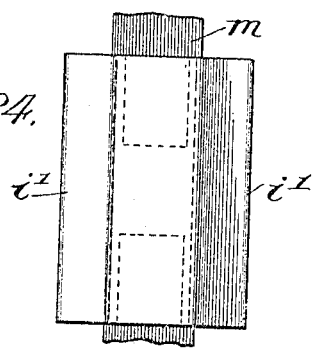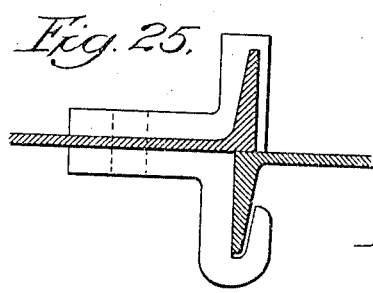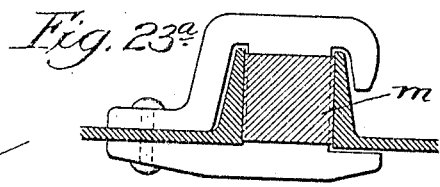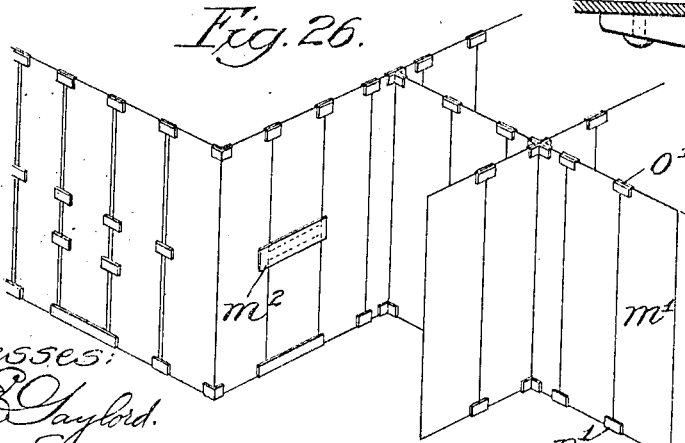

UNITED STATES PATENT OFFICE.

EDWARD A. BERN, OF CHICAGO, ILLINOIS.

PILING.

950,608.  Specification of Letters Patent.  Patented Mar. 1, 1910.

Application filed June 8, 1907. Serial No. 378,022.

*To all whom it may concern:*

Be it known that I, EDWARD A. BERN, a citizen of the United States, residing at Chicago, in the county of Cook and State of Illinois, have invented certain new and useful Improvements in Piling, of which the following is a specification.

The object of my invention is to provide new and improved means for constructing metallic sheet piling structures, and especially to provide an improved guide to direct the piles during the driving operation and to lock them together.

As is well-known steel piles have heretofore been either specially rolled with interlocking elements on the edges thereof, or have been fabricated from structural iron of ordinary shapes, such as channels and I-beams. The latter forms have generally been built-up from two complete channel irons secured together and used in connection with intermediate channels or I-beams or by means of Z-shapes extending throughout the length of channel irons in such manner as to form a space wherein the flange of the adjacent pile can be inserted longitudinally. In one form of built-up or fabricated pile a series of Z-bar clips, each a few inches in length, have been attached at intervals of about five feet along the length of a channel iron. All of these forms are open to serious objections, growing out of the cost of manufacture, the difficulty of driving and of withdrawing the piles after they have served their purpose. The specially rolled piling can generally be obtained only from a single mill, which is in itself an inconvenience, in view of the fact that piling is used in all parts of the world.

The fabricated or built-up piling is subject to heavy import duties when taken to foreign countries, and if such piling is fabricated abroad there is the resulting trouble of shipping the special parts necessary and the fact that often the facilities in the foreign countries or at the place where the piles are to be used are insufficient for the purpose of fabricating. Furthermore, the punching of rivet-holes necessary in the fabrication of such piles renders the structural iron unfit for other uses, thus reducing its value after its use as piling to a minimum. A further disadvantage of forms now in use lies in the fact that special structures for corners, junctions, etc., are necessary, such structures costing at least twenty-five per cent. over and above the cost of the other forms of piling. The form of piling in which separate clips are spaced along the pile is also subject to the disadvantage that these clips are likely to become distorted or sheared off in use. A further disadvantage encountered in the use of piles in which the guide-way extends throughout the length of the pile, whether rolled as part of the pile or formed by fabricating a pile of ordinary shape, results from the fact that soil and pebbles become packed or embedded in the guide-way and resist the movement therein of the coöperating member of the adjacent pile to the impairment of the strength and utility of the piling.

By my invention I have avoided all of the objections above referred to and have succeeded in constructing an efficient interlocking means for sheet piling, free from the objections above referred to and facilitating the driving and withdrawing of the piles. My improved system of sheet piling is also more economical in first cost and in driving than previous forms and has the additional advantage that the structural iron used is not punched in such a manner as to impair its value for subsequent use for other than piling purposes.

Another advantage of my improved system of piling lies in the fact that it is adapted for use with any form of structural iron, including the usual forms, such as channels, I-beams, etc., and any special forms may be provided with interlocking means embodying my invention. In the following description and claims I use the term pile broadly as referring to any form of structural iron used as a pile.

In the drawings—Figure 1 is a view showing a driven pile and a pile being driven. Fig. 2 is a cross section of the structure shown in Fig. 1. Figs. 3, 4, 5 and 6 are views from the four sides of a lock, guide and shoe constructed in accordance with my invention. Fig. 7 is a plan view of the same. Figs. 8 and 8ª are views of the junction between two piles of channel iron, showing my improved lock, guide and shoe and a wooden packing strip between the piles. Fig. 9 is a plan view, partly in section, showing my improved lock, guide and shoe as adapted for use where the flanges of the channel irons are interlocked instead of abutting as shown in the previous views. Fig. 10 is a detached plan view of the lock, guide and shoe illustrated in Fig. 9. Figs. 11 and 12 correspond to Figs. 9 and 10, showing the structure adapted for use where a packing strip is inserted between the flanges of the interlocking channels. Fig. 13 is a plan view of a special form of lock and guide adapted for use at the top of a pile. Fig. 14 is an elevation of the structure shown in Fig. 13. Fig. 15 is a plan view, partly in section, of the corner of a piling structure fitted with a lock, guide and shoe constructed according to my invention, the flanges of the piles in this instance being directed outwardly from the excavation. Fig. 16 is a plan view, partly in section, showing the structure illustrated in Fig. 15 adapted for use with an interposed packing strip. Fig. 17 is a plan view, partly in section, of two piles forming a corner and fitted with a lock, guide and shoe constructed according to my invention, the flanges of the piles in this instance being directed toward the interior of the excavation. Fig. 18 is a plan view, partly in section, showing the structure illustrated in Fig. 17 adapted for use where a packing strip is interposed between the flange of one pile and the web of the other. Fig. 19 is a sectional view designed for use upon the closing pile or last pile driven. Fig. 20 is a sectional view showing a shoe designed for use where two walls of sheet piling cross each other. Fig. 21 is a sectional view of a shoe designed for use at the junction of two walls of sheet piling with a packing strip. Fig. 22 is a view showing a form of shoe adapted for use at the junction of two walls of sheet-piling without a packing strip. Fig. 23 is a sectional view of an interlocking guide adapted particularly for use in connection with broken joint sheet piling structures, but also available for the purpose of clamping continuous piles intermediate their ends. Fig. 24 is an elevation of the interlocking guide and packing strip shown in Fig. 23. Fig. 23$^a$ is a modification of the form shown in Fig. 23. Fig. 25 is a sectional view of a shoe designed for use with two channel irons having their webs contacting and their flanges turned in opposite directions. Fig. 26 is a perspective view of a sheet piling structure showing the use of the interlocking guide shoes, illustrated in the other views.

Generally speaking, my invention consists in the use of a lock, guide and shoe provided with a socket adapted to receive the end of a pile and an interlock to receive the side flange of an adjacent pile.

I have adopted the term "lock, guide and shoe" or "interlocking guide shoe", for the reason that the part referred to performs the function of a shoe in assisting in the penetration of the soil, the function of a guide while the pile is being driven and the function of a lock after the piles are in place.

In the drawings, the lock, guide and shoe is designated generally by the letter $a$. Referring to Figs. 3 to 7, inclusive, the lock, guide and shoe $a$ is provided with a socket $b$ extending downwardly from the top about half the length thereof. This socket is adapted to receive the end of one of the piles. Upon one of its sides the member $a$ is formed with an interlocking guide designated generally by the letter $c$. In the form of shoe illustrated in Figs. 3 to 8 this guide consists of an overhanging hook or flange $d$ adapted to embrace and slide upon the flange of an adjacent pile. Opposed to the overhanging hook or flange $d$ is a projection $e$ adapted to embrace the flat side of the adjacent channel iron. The interlocking guide $c$ is constructed of sufficient width to receive also the flange of the driving pile, and the lower end of the socket $b$ is continued into the guide $c$ in the form of a projecting ledge $f$. It will be understood that it is not absolutely necessary to fit a shoe to the first pile driven.

Referring to Fig. 1, the driven pile $g'$ is shown at the right. Prior to bringing the driving pile $g$ into position, one of the interlocking guide shoes $a$, the upper one,—as shown in Fig. 1—is slid upon the flange of the pile $g'$ with the socket $b$ directed downwardly. A second interlocking guide shoe with its socket directed upwardly is then fitted to the lower end of the pile $g$, and said pile is then lowered and the guide $c$ of the lower interlocking guide shoe caused to engage the flange of the driven pile $g'$. The pile is then lowered still farther until the downwardly directed socket of the upper interlocking guide shoe engages the upper end of the driven pile $g'$. The upper interlocking guide shoe then becomes a stationary guide at the upper end of the driven pile $g'$. The lower interlocking guide shoe, fitted to the lower end of the driving pile $g$, travels down with said pile as it is driven and guides the lower end of the same. The driving pile $g$, therefore, throughout the driving operation is guided at two points, namely, by the upper interlocking guide shoe, at the top of the driven pile $g'$, and by the lower interlocking guide shoe, at the bottom of the driving pile $g$.

Referring again to Figs. 3 to 8, it will be observed that I have tapered the lower end of the shoe in order to facilitate its entrance into the soil. I have not only tapered the sides of the shoe at $h$, but have also tapered the exterior of the guide clamp, as shown at $i$ and $i^2$. It will be noted that the shoe is tapered more at $i^2$ than at $i$. The greater taper at $i^2$ is for the purpose of deflecting the driving pile toward the previously driven pile, this action being effected by the engagement of the tapered surface $i^2$ with the soil.

In some instances it may be desirable to secure the interlocking guide shoe to the pile by means of a bolt. This, however, will not in all cases be necessary as the strain of driving will be taken between the abutting surface of the bottom of the pile and the bottom of the socket in which it is inserted, and these parts may be made to fit with sufficient tightness to cause the interlocking guide shoe to remain on the pile until the same rests upon the soil. In order, however, to protect the head of the bolt and the nut thereon when the same is used, I have, in the form of my invention shown in Figs. 3 to 8, formed shoulders $k$ upon the sides of the interlocking guide shoe below the bolt-holes $l$, and have tapered the shoe from the outer edge of these shoulders to the lower end of the shoe, as shown. When the interlocking guide shoes are bolted to the piles in the manner referred to, it will be necessary to punch a hole near the lower end of the pile. This hole, however, may be in the position in which structural iron shapes are usually punched in which event it would not impair the value of the iron for subsequent use for structural purposes. The bolt-hole, furthermore, is near the end of the structural iron and if desired the perforated part may be cut off with a minimum of waste.

In Fig. 8 I have shown my improved interlocking guide shoe as adapted for use in those cases where it is desired to insert a packing strip $m$ of wood or other material between the flanges of the adjacent piles. This shoe differs from that previously described in that a wall $f'$ separates the socket, $b$, from the interlocking guide $c$. This wall is recessed at the top forming a pocket to receive the packing strip and on the under side of the wall the metal is carried down to the bottom of the shoe and the shoe is tapered in the manner described in connection with Figs. 3 to 7. The shoe illustrated in Fig. 8 has an additional use in connecting with structural forms which have been coped i. e. in which one of the corners has been cut away. Referring to Fig. 8, if the lower corner of the channel iron at the left had been cut away, as is frequently done in the use of such members in structural work, it would still be possible to use it as a pile in connection with the interlocking guide shoe shown in that figure. It would simply be necessary to move the shoe to the left so that the wall $f'$ would be in the recessed lower corner of the left hand pile, in which case the flange of the channel member at the left would lie above the wall $f$ instead of the packing strip, as shown.

The form of my invention illustrated in Figs. 1 to 8 is designed for use in those cases where channel irons are used for piles and where the webs of such irons are placed in alinement with the flanges turned in the same direction, such flanges abutting against each other.

In Figs. 9 to 12 my invention is illustrated as adapted for use in connection with channel irons having their flanges oppositely directed and interlocked one with the other. My improved interlocking guide shoe as adapted for such use differs from that above referred to principally in the form of the interlocking guide. In this case the interlocking guide consists of a projection $n$ having an overhanging flange $o$ adapted to engage the flat face of the previously driven pile. The guide clamp also comprises a projection $p$ extending around and beneath the interlocking flange of the driving pile.

The interlocking guide shoes, above described, are equally well adapted for use at the bottom of the driving pile and at the top of the previously driven pile, as will be readily apparent from an inspection of Fig. 1 of the drawings, from which it will appear that the upper and lower interlocking guide shoes, there illustrated, are identical in form, but reversed in position. In some cases, however, it may be desirable to construct a special interlocking guide hood, such as illustrated in Figs. 13 and 14, for use at the top of the driven pile. The shoe there illustrated is simpler in form than the shoes previously described, in that the tapering at the end is omitted, such tapering being unnecessary in view of the fact that the upper shoe does not enter the soil. It will also be apparent by reference to Figs. 1 and 2 that in cases where the piling work progresses from left to right instead of from right to left, as illustrated in those figures, it would be necessary, if piles of the form illustrated were used and the flanges were turned in the same direction to have shoes similar to those shown, but bearing the relation of right to left thereto. In cases, however, where piles of symmetrical cross section, such as I-beams, are used, there would be no necessity for providing right and left shoes, the same shoe being adapted for all uses. It would be necessary to provide shoes of the form shown in Figs. 9 to 12 in both the right hand and the left hand form irrespective of which direction the work progresses.

In Figs. 15 to 18 I have illustrated a form of my shoe adapted for use at the corner of a piling structure. The form of these shoes is apparent from the drawings, and differs from those previously described merely in the form of the interlocking guide, the latter being adapted to conform to the altered relative position of the piles.

The form of shoe illustrated in Fig. 19 is designed for use upon the closing pile of a sheet piling structure. Assuming that the piles $a^1$, $a^2$ have been driven leaving a gap between them in which it is necessary in closing the structure to drive a pile and to provide means for guiding and locking the same between the piles $a^1$, $a^2$. The shoe illustrated in this view is of the full width of the closing pile $b^1$ and is provided at its opposite ends with interlocking guides $c^1$. The shoe illustrated in Fig. 19 may be provided with a socket at both top and bottom, in which case it will be used as an interlocking guide and not as a penetrating shoe. Such a form of interlocking guide would be useful in broken joint piling structures, as shown at $m^2$ in Fig. 26 of the drawings.

In Fig. 20 I have illustrated a shoe $d^1$ provided with a socket to receive the lower end of the pile $e^1$. Assuming that the piles $f^1$, $f^2$ have been driven, the pile $e^1$ is fitted with the shoe $d^1$ and the packing strips $g^1$ then placed in position and the interlocking guides $c^2$ fitted to the previously driven piles $f^1$, $f^2$. The pile $e^1$ is then driven, thus forming the crossing of two walls of sheet piling.

Fig. 21 is an illustration of what may be termed a three-way shoe, i. e. a shoe adapted for use at the junction of two walls angularly disposed to each other. In Fig. 22 a modified construction for the same purpose is shown.

In Figs. 23 and 24 I have illustrated an interlocking guide designed to be used in constructions where an interposed packing strip $m$ is used. This interlocking guide in the completed structure will be located intermediate the ends of continuous piles, or in broken joint pile construction the interlocking guide will in the completed structure be located at the joints between the separate lengths of piling. The location of the interlocking guide in the completed piling structure is clearly indicated in Fig. 26. As shown in the drawings, the interlocking guide consists of a central part $h'$ designed to lie between two adjoining piles, and interlocking elements $i'$ designed to overlie the adjoining piles and secure them against relative transverse movement while permitting independent longitudinal movement of the same.

In Fig. 23ᵃ I have shown an interlocking guide similar to that illustrated in Fig. 23, but having the arms of the guide extended and perforated in such manner that the guide may be riveted in place upon one of the piles to which it is fitted.

The central part $h'$ of the interlocking guide is provided with sockets above and below to receive the ends of the interposed packing strips, as clearly shown in Fig. 24. The interlocking guide does not engage the end of the pile as in the case of the interlocking guide shoes above described. In order to carry the interlocking guide to its proper position, it is fitted between and to the piles and to the packing strips placed in position above and below it. The blow of the hammer in driving the pile is transmitted through packing strips to the interlocking guide, thus carrying it to its proper position, as shown in Fig. 26. The packing strip may be made somewhat wider than the central part of the shoe, as shown in Fig. 23, for the purpose of compensating for abrasion and compression thereof. The packing strip might also be so constructed as to overlie the sides of the central part $h'$, thus presenting a continuous packing from end to end of the piling structure.

Fig. 25 shows a form of shoe adapted for use where the webs of the pile are in alinement but their flanges turned in opposite directions. In case it is desired to construct a curved wall of sheet piling, it is obvious that the form of the interlocking guide shoe and of the interlocking guide can be arranged in such manner that each pile will be disposed at an angle to the adjacent one.

It will be obvious that the form of the interlocking guide illustrated in Figs. 23 and 24 may be modified for use with other forms of structural iron than that shown, or for use at junctions, intersections, corners and in curved walls.

An especially valuable advantage secured by the use of the interlocking guide shoes, described herein, is the fact that after withdrawing a pile a few inches it becomes entirely disengaged from the adjoining pile. Referring to Fig. 26 it will be evident that upon removing the member $o'$ and raising the pile $m'$ sufficiently to disengage it from the member $p'$ the pile $m'$ will be completely disconnected from the remainder of the structure, thus greatly facilitating its withdrawal.

The use of my improved lock guide and shoe is not restricted to any particular form of structural iron but may be adapted for use with metal of any cross sectional form. This feature is of especial importance as it renders it possible to use my invention in localities and under circumstances where the ordinary structural shapes are not procurable. The only equipment necessary to carry out my invention is a portable foundry with which shoes can be cast adapted to coöperate with structural shapes of any form, it being understood that the interlocking guide shoes may be constructed of any suitable material obtainable. My invention, however, is not limited to the idea of making the interlocking guide shoes of cast metal, as they may be forged, rolled or otherwise formed.

It will be understood that Fig. 26 is a diagrammatic view in which no attempt has been made to show the exact form or dimensions of the parts. In some cases, as where special shoes of the form shown in Figs. 20 and 22 are used, the next adjacent piles cannot be driven as deep as the piles to which special shoes are fitted. For this reason the special shoes are fitted to piles longer than the others in order that the latter may be driven to the depth required. The piles $e'$ $f'$ and $f^2$ shown in Fig. 20 would all be of greater length than the other piles, the length of the piles $f'$ and $f^2$ being increased in order to prevent the shoe $d'$ from becoming disengaged therefrom.

What I claim is:

1. An interlocking guide shoe for piling, said shoe being provided with a socket extending inwardly from one of the ends thereof, and a recess having an overhanging wall, said recess extending along one of the sides of said shoe and from end to end thereof, the walls of said socket being provided with oppositely disposed bolt holes, outwardly extending shoulders upon said shoe beneath said bolt holes, said shoe tapering downwardly from said shoulders to a sharp edge.

2. In a piling structure, two adjacent flanged piles, and an interlocking guide shoe having a socket fixedly engaging the end of one of said piles, said shoe being also provided with an interlocking guide member adapted by engagement with the flanges of said piles to lock them together transversely but permitting relative longitudinal movement thereof, said shoe being tapered to a sharp edge beneath the socket therein.

3. In a piling structure, two adjacent flanged piles, a packing strip between said piles, and an interlocking guide shoe having a socket fixedly engaging the end of one of said piles, said shoe being also provided with an interlocking guide member adapted by engagement with the flanges of said piles to lock them together transversely but permitting relative longitudinal movement thereof.

4. An interlocking guide shoe for piling, said shoe being provided with a socket extending inwardly from one of the ends thereof to receive the web of one of two adjoining piles, an interlocking guide upon said shoe adapted to embrace the flanges of said adjoining piles, and a ledge extending into the interior of said interlocking guide.

5. In a sheet piling structure, two channel irons having their webs in alinement, an interlocking guide shoe having a socket extending inwardly from the end thereof, and an interlocking guide on one side thereof, one of said piles having its end inserted in said socket and abutting against the bottom thereof and the other pile having its flange slidably engaged by said guide, said shoe being tapered to a sharp edge beneath said socket.

6. In a piling structure, two flanged members having their webs angularly disposed relative each to the other and the outside of the flange of the first of said members lying adjacent the web of the second member near the edge thereof, and an interlocking guide shoe having a socket extending inwardly from one end thereof, the end of said second member being inserted in said socket and said shoe being also provided with an interlock adapted to slidably engage the flange of said first member.

7. An interlocking guide shoe for sheet piling, said shoe having a socket extending inwardly from the end thereof and adapted to receive the end of a pile, and an interlocking guide on one face of said shoe adapted to slidably embrace the flange of a pile disposed at an angle to the first-mentioned pile.

8. In a sheet piling structure, two adjoining flanged piles, an interlocking guide having a central part lying between said piles, and end parts engaging said piles in such manner as to prevent relative transverse movement thereof, but permitting relative longitudinal movement.

9. A sheet piling structure, comprising an interlocking guide having parts engaging two adjacent piles and a part extending between the same, and packing strips between said piles above and below said guide.

10. An interlocking guide for sheet piling, comprising a central part adapted to extend between two adjoining piles, and interlocking members adapted to slidably engage said piles and lock them against transverse displacement.

11. An interlocking guide for sheet piling, comprising a central part adapted to extend between two adjoining piles, and interlocking members adapted to slidably engage said piles and lock them against transverse displacement, said central part being provided on its upper and lower sides with sockets to receive the ends of packing strips.

12. An interlocking guide shoe provided with a socket to receive the end of a pile being driven, and with an interlocking guide adapted to embrace and slide upon the previously driven pile, the lower end of said shoe being tapered toward the abutting part of the previously driven pile in such manner as to force the piles into contact.

13. An interlocking guide shoe for piling, said shoe being provided with a socket extending inwardly from one corner of one of the ends thereof to receive the corner end of a pile, and a recess extending along one of the sides of said shoe and from end to end, said socket and recess being divided by a cross wall.

14. An interlocking guide shoe for piling, said shoe being provided with a socket extending inwardly from one corner of one of the ends thereof to receive the corner end of the pile, and a recess extending along one of the sides of said shoe and from end to end, said socket and recess being divided by a cross wall, and said cross wall having a pocket or recess adapted to engage the end of a packing strip.

15. A piling structure comprising a series of piles, packing strips between said piles, and shoes fitted to the lower ends of said piles and engaging the bottom thereof, each of said shoes having an interlocking guide slidably engaging the pile next to that to which it is fitted.

16. An interlocking guide shoe for piling, said shoe being provided with a socket extending inwardly from one of the ends thereof, and an interlocking guide on one side of said shoe, the socket and interlocking guide of said shoe being adapted to engage adjacent piles in such manner as to leave space between them for a packing strip.

17. A sheet piling structure comprising a plurality of piles, an interlocking guide shoe having a socket extending inwardly from one end thereof, said socket engaging the end of one of said piles, an interlocking guide on one side of said shoe, a ledge extending partially across said interlocking guide, a second pile engaged by said interlocking guide and spaced from said first pile by said ledge, and a packing strip between said piles.

18. A corner structure for sheet piling, comprising two flanged iron piles disposed at an angle each to the other, the flange of one pile being parallel to the web of the other, and an interlocking guide shoe having a socket engaging the end of one of said piles and having an interlocking guide slidably engaging the other pile.

19. In a piling structure, two adjacent flanged piles, a packing strip between said piles extending throughout the length thereof, and an interlocking guide shoe having a socket fixedly engaging the end of one of said piles, said shoe being also provided with an interlocking guide member adapted by engagement with the flanges of said piles to lock them together transversely, but permitting relative longitudinal movement thereof.

20. An interlocking guide shoe for piling, said shoe being provided with a socket extending inwardly from its upper end and with a recess extending along one of the sides thereof from end to end, said recess having an overhanging wall, and the lower end of said shoe being tapered to a sharp edge.

EDWARD A. BERN.

Witnesses:
WALTER A. SCOTT,
HALODAN STABELL.